Nov. 17, 1936.  R. MACKAY  2,060,816

PRODUCTION OF MULTICOLOR PRINTING PLATES

Filed Aug. 27, 1934

Witness:
Chas. P. Koursh

Inventor,
Robert Mackay.
By W. Bartlett Jones, Atty.

Patented Nov. 17, 1936

2,060,816

UNITED STATES PATENT OFFICE 2,060,816

PRODUCTION OF MULTICOLOR-PRINTING PLATES

Robert Mackay, Chicago, Ill.

Application August 27, 1934, Serial No. 741,597

5 Claims. (Cl. 95—2)

The present invention relates to color photography for multicolor printing positives used to reproduce colored pictures. It has particular reference to improvements in making four-color-printing positives, especially for off-set printing, indirect printing, and rotogravure processes.

The general principles of this art are well developed and it is referred to as the color subtractive process. In general the process consists of illuminating a colored field, such as a picture, with a day-light spectrum, preferably from an artificial source more intense than sun-light; then photographing the field several times, preferably four, through certain color filters which form negatives from the different light values which pass through the filters. Usually for a four-color process these filters constitute one filter for a black and white, or key-negative, and three filters for color values. The color filters pass in major portion, red light, green light and blue light, and thus three color-value negatives are obtained. From these four negatives, positives are made for printing. The positive from the negative made by red light is used with a blue ink to print blue. The positive from the negative made with green light is used with a red (magenta) ink to print red. The positive from the negative made with blue light is used with yellow ink to print yellow. Separate impressions from the positives derived from such negatives are superimposed in register, and the color values merge in the human eye to give a semblance in color of the original field.

The degree of perfection in the reproduction is influenced by many factors in part due to the nature of light, and in part due to the imperfections in the means employed. A variation in the spectrum of light on the field when the negatives are made alters the color values. Since light values shade from red to violet in the spectrum there is no such absolute thing as a pure color red, yellow or blue, as the term is used in common parlance, but there is a definite identification for every pure color in the wave-length of the light wave producing the color sense. These are tagged in units called mille microns, hereinafter referred to as "mu". The visual range of color to human beings is generally designated from 400 mu to (the blue end) to 700 mu (the red end).

The kind of photographic plate alters the values recorded in the above described process. Some plates are more sensitive to one range of wave lengths than to others. However, there are plates known as "panchromatic plates" which are generally equally sensitive over the entire visible spectrum. The process of this invention has been developed and is herein described with reference to use of a very good panchromatic plate, but it is to be understood that the process may be modified to compensate for changes made by changing the light-sensitive plates used for the several color-produced negatives.

Still another factor which enters into consideration is the character of each color filter employed. Many special and standard color filters are known which permit certain wave lengths to pass freely or in part through them, while excluding other wave lengths almost entirely. The success of the process depends in part upon the choice of color filters.

It is not practical to attain perfection by using substantially perfect color filters which pass only a very limited band of light, and to use a sufficiently great number of them which together pass all the light, thus to produce a perfect negative for each band. The commercial art has therefore limited itself to three or four such filters, in order to reduce the number of color impressions needed in printing. In doing this the art has encountered deviations from the true values. These deviations have been corrected by special measures, including hand retouching of either negatives, or of positives made from incorrect negatives.

Still another source of imperfection in reproductions is the character and tone value of each of the inks used for the printing, as well as the sequence of applying the inks.

The present invention aims to overcome and to limit the degrees of inexactness in the negatives, and thus to eliminate the necessity of retouching either the negatives or the positives.

It is a particular object of the invention to produce negatives by a selected set of filters, preferably those now in use and accepted as standard, and to correct one negative where necessary by use of one or more of the remaining negatives.

It is a further object to correct the errors of values in one negative by masking it with a thin positive made from one of the other negatives.

It is another object to make a "corrected negative" by combining the uncorrected negative with a thin positive from another uncorrected negative.

It is another object of the invention to photograph onto the negatives as a part of the original field a color scale or chart which is later used in determining the desired intensity of the "thin positive" used to make the correction.

Still another object of the invention is to use a color chart or scale in the field, which chart is made with the inks intended to be employed with the plates resulting from the photographing of the chart along with the object.

Various other and ancillary objects and advantages of the invention will become apparent from the following description and explanation of the invention as it is described for the purpose of illustration, with reference to the accompanying drawing, in which.

Figure 1:
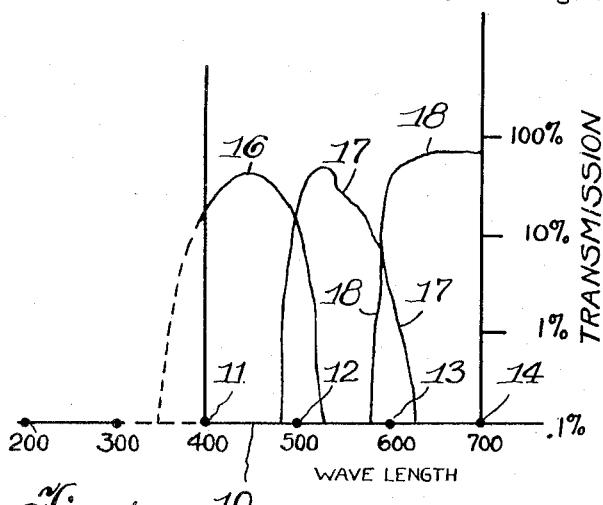
Fig. 1 represents a spectrum scale and the light transmission qualities of color filters employed.

In Fig. 1 I show line 10 which represents in full lines the visual spectrum from 400 mu to 700 mu, and extensions thereof into the so-called invisible field. The points 11, 12, 13, and 14 represent respectively light wave-positions 400 mu, 500 mu, 600 mu and 700 mu, dividing the spectrum generally into the blue end, the green middle, and the red end. By choosing three certain color filters known to the art as Wratten filters No. 25 A (red), No. 58 B2 (green), and No. 47 C5 (blue), the entire visual band is included. The form of lines 16, 17, and 18 and the extent of the lines above the ground line 10 represent the transparency of the filter to the various wave lengths of light. Because it is desirable to use all of the spectrum, and because of limitations by the filters, there are overlapping parts where some wave lengths of light come through at least two filters, and are registered on at least two of the negatives.

Figure 2:
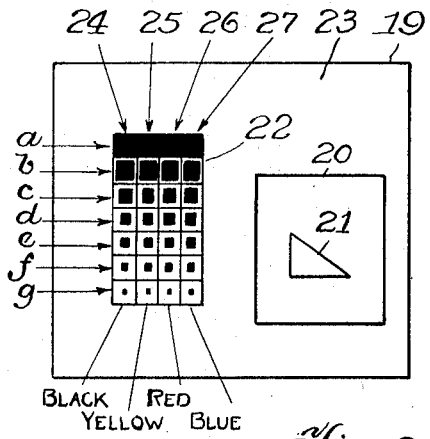
Fig. 2 represents a field to be photographed including an object to be reproduced, and a colored chart for control purposes.

In carrying out the invention a fixed procedure is followed which is predicated upon maintaining standardized conditions. For best results standardized inks are employed. A color chart in four scales is created with these inks as indicated in Fig. 2, in which numeral 19 represents the field photographed. The picture or other colored field to be reproduced is represented by the block 20 in which an object 21 is indicated. A color scale or chart 22 is shown as a part of the field. The field elsewhere is a very clean white background 23.

The color chart may be varied and I prefer to use one having seven shades of the colors shown in strips 24, for black, 25 for yellow, 26 for red, and 27 for blue. The seven shades or degrees of intensity are designated $a$, $b$, $c$, $d$, $e$, $f$, and $g$, wherein $a$ is the intense color and $g$ is a most delicate tint of the color. The intensity is indicated by the size of the dark squares, and it is to be understood that the indicated amount of color is to be considered as spread out entirely over the small white square in which each is contained.

In the black and white scale the intensities vary in the same order as a negative will vary by doubling the time of plate exposure in the adjacent blocks. The black and white scale 24 is used as a key or control. The key-plate is well known in the art. It may be formed in numerous well known ways. One of these ways is to use a yellow compensating filter in order to repress the speed of the faster acting colors when the negative is made. As made and used in this invention, prior art practice may be followed. A yellow color filter designated Wratten filter K—3 is used in photographing a black and white negative from which a black-printing positive plate is made. The times of exposure and development of the panchromatic plates used are such that in the negatives made with all the filters the intensity values in black and white scale 24 and background 23 are the same in all of the negatives which are made. These times of exposure and development and the intensity of illumination of the field are fixed as standardized conditions for the making of plates for reproducing other objects. It is to be understood that the time of exposure and development need not be the same for each plate. Ordinarily it is different for the four plates here described. The goal at which the photographer is to "shoot" for each negative, is to make the plate have the same color value as the black and white scale 24. Thus in all of the four negatives, the black and white scale 24 are substantially identical.

In the making of the color negatives Wratten filters No. 25 A (red), No. 58 B2 (green), and No. 47 C5 (blue) are used. No attention is paid to the colored object 21, but all operations are determined by reference to intensities in the chart 22 as reproduced in the negatives and in positives made from the negatives.

Figure 3:
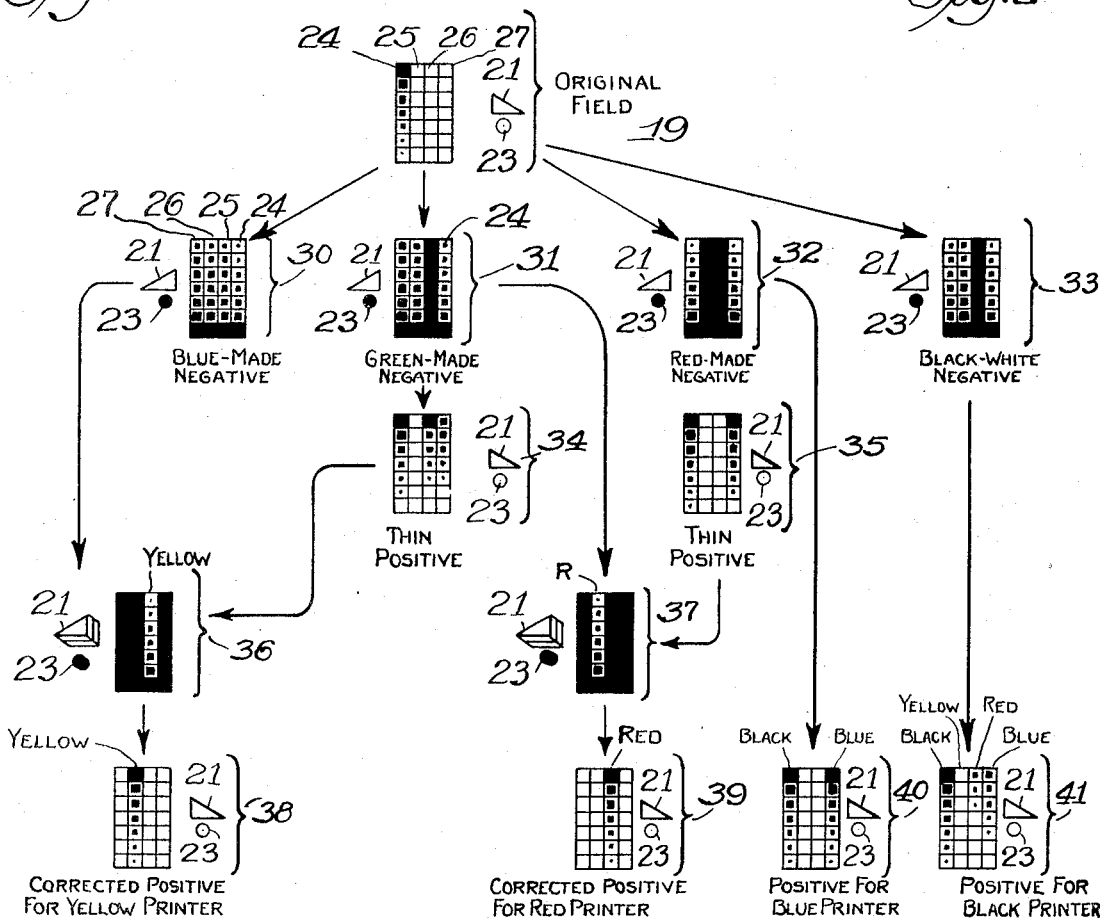
Fig. 3 is a diagrammatic sketch of the entire process, showing how control is effected by intensities of photographic images of the color scales in the control chart.

In Fig. 3 there is shown a diagrammatic representation of the process, legends, numbers, and arrows being employed in order to follow the scheme. The original field 19 is made into negative plates 30, 31, 32, and 33 with the blue, green, red, and yellow filters respectively. The color values of the resulting plates are indicated in the squares of the chart by the size of the intensity inclusions therein. It is to be noted that the white background 23 of the original field is black in these negatives, and this is indicated by the intensity in circle designated 23, the same numeral which has been used for the background in Fig. 2. The intensity of the squares in the chart is indicated in the same manner as in Fig. 2.

From the green-made negative 31 a thin positive 34 is made which is placed emulsion to emulsion over the blue-made negative 30 as a corrective screen, the two being suitably secured in register. In making the thin positive there are of course many degrees of intensity which are permitted. I control the intensity so that when the red strip 26 of the negative 30 plus the red strip 26 of the thin positive 34 combine to blank out and be substantially (as much as possible) matched with the intensity of the black background in the negative 30. This controls the extent to which the negative 30 is corrected. Then I make a thin positive 35 in the same way from the red-made negative 32, and superimpose it in register, emulsion to emulsion, on the green-made negative 31 so as to wipe out the blue scale to merge it with the background 23. The control is the same as before, and the two strips 27 when superimposed merge into the black background 23 of the negative 31 as closely as possible.

From the corrected blue-made negative 36 and the corrected green-made negative 37, and from the red-made negative 32 and the key negative 33, any number of positives 38, 39, 40, and 41 may be made which are suitable for the direct production of printing plates for the particular processes to be used. The positives 38, 39, 40, and 41 produce plates printing respectively yellow, red, blue, and black. In making the positive plate 41 from the key-negative 33, the positive is preferably made at about one-half the density or some other fractional density of the original field. This is because the black ink prints so heavy. However, the extent to which the intensity is reduced may readily be determined by the character of the original to be reproduced. The function of the black is to give the sharpness which the reproduction requires. The inks preferred are those used in laying out the original color chart, since the results are affected by the individual color characteristics of the inks.

Where rotogravure plates are used the results are highly satisfactory. One reason for this is the impracticability of mechanically altering the etching employed on rotogravure cylinders. The usual order of impression is yellow, red, blue, and then black, but this may be altered according to the opaqueness or covering power of the inks employed. These variations are well known in the art.

The nature of the correction may be explained on a theoretical basis. It will be noted that the color scales on the chart 22 contain "white" mixed in with the black, yellow, red and blue. The red-made negative 32 contains image not only from the red scale, but from the white in all the scales. Where there is image in the negative 32 from red in the chart, no blue ink will be printed by the positive 40.

The figures show clearly that the green-made negative, which produces the red-printer plate, would, if uncorrected, print red from color or tints in the black, red and blue scales. It likewise appears that the uncorrected blue-made negative would make a printer-plate which would print yellow ink from color or tints formed not only from the yellow scale, but from the black, red and blue scales.

By the blanking out processes herein described it will be seen that the yellow-printer 38 prints yellow from impression areas determined only by the yellow in the chart 22 and in the same proportion. Likewise the red printer 39 prints red from impression areas determined only by red in the chart 22. The blue printer prints blue from impression areas determined by both the blue and the black in the scale. Because of the dark and almost black character of the blue, optically, rather than actinically, this has little effect on the optical perfection of the reproduced original. The art has long accepted the blue-printing plate, made from the red filter, as sufficiently perfect that no correction has been considered necessary heretofore. It is likewise acceptable in the process here described. The key-plate being made in its positive form at considerably less than original intensity, introduces practically no black into regions of other colors. This is readily controlled.

Ordinarily the originals in reality have little or no black, and hence the showing of impression areas in scale 24 of positive 40 is immaterial, since there are no black areas in the reproduction where corresponding impression areas are formed. Where there is black in the original, it is taken care of by the black printer, which superimposes black over any little blue which has been printed.

The present invention is not limited to the three color plates herein described, and may be used in other and more complicated photo-mechanical color-printing processes. It will be noted that the corrections of negatives are ordered, in that each corrected negative is united with a thin positive from a negative from the adjacent color filter toward the red end of the visual spectrum, leaving the negative from the extreme red end uncorrected, and the negative from the extreme blue end without a thin positive made from it. Insofar as the corrections may be applicable in this order, the principle may be applied as the series of color filters is changed to a different number.

Those skilled in the art may fully comprehend the use of the present invention in various fields of color printing, and in the accompanying claims the invention is set forth in terms comprehending such uses, changes and modifications. A valuable feature of the process is that unskilled help may be trained to a fixed routine of practice, which will always reproduce the desired results without the exercise of skill and judgment on the part of the operator, or assistance from skilled retouchers.

It will thus be seen that the present process provides a method for making satisfactory plates by photography alone. The necessity of retouching negatives, or of positives, is entirely eliminated, quicker, cheaper, and better work is thus secured.

I claim:

1. A process for producing color-separation images for use in making printing plates comprising making a key negative and three color-separation negatives of the same colored field respectively through red, green, and blue filters, making thin positives from the red-made and green-made negatives, superimposing the thin positive from the red-made negative in register on the green-made negative to form a corrected green-made negative, making a thin positive of the uncorrected green-made negative, superimposing the thin positive from the green-made negative in register on the blue-made negative to form a corrected blue-made negative, and printing a set of positives from the corrected blue-made negative, the corrected green-made negative, the red-made negative, and the key negative for the production of plates to print respectively with yellow, red, blue and black inks.

2. The method of making in a photo-mechanical color printing process a color-separation image for the production of a yellow-printing positive plate which comprises photographing a colored field through a filter passing light from the blue end of the visual spectrum to form a blue-made negative, photographing the same field through a filter passing light from the green or middle region of the visual spectrum to form a green-made negative, making a thin positive from the green-made negative, and superimposing the thin-positive in register on the blue-made negative, whereby the combined images form a corrected negative from which yellow-printing positives may be made.

3. A negative plate for making a positive yellow printing plate in a photo-mechanical color-printing process having image which consists of a negative image of a colored field made through a blue filter, and a superimposed-in-register image in the form of a thin positive image made from a negative image of the same field through a green filter.

4. The method of making color-separation images for the color plates of a photo-mechanical color-printing process which comprises selecting a series of color filters which together include the visual spectrum, photographing a colored field individually through each filter to form a like series of negatives, making thin positives of all the negatives except that from the last filter at the blue end of the spectrum, and superimposing the thin positives in register respectively upon the adjacent negatives toward the blue end, thereby correcting all the negatives except the one from the first red end filter.

5. The method of making color-separation images for the color plates of a photo-mechanical color-printing process which comprises selecting three color filters which together include the visual spectrum, photographing a colored field individually through each filter to form three negatives, making thin positives of all the negatives except that from the blue end of the spectrum, and superimposing the thin positives in register respectively on the adjacent negative toward the blue end, thereby correcting all the negatives except the one from the red end filter.

ROBERT MACKAY.